Figure 1:
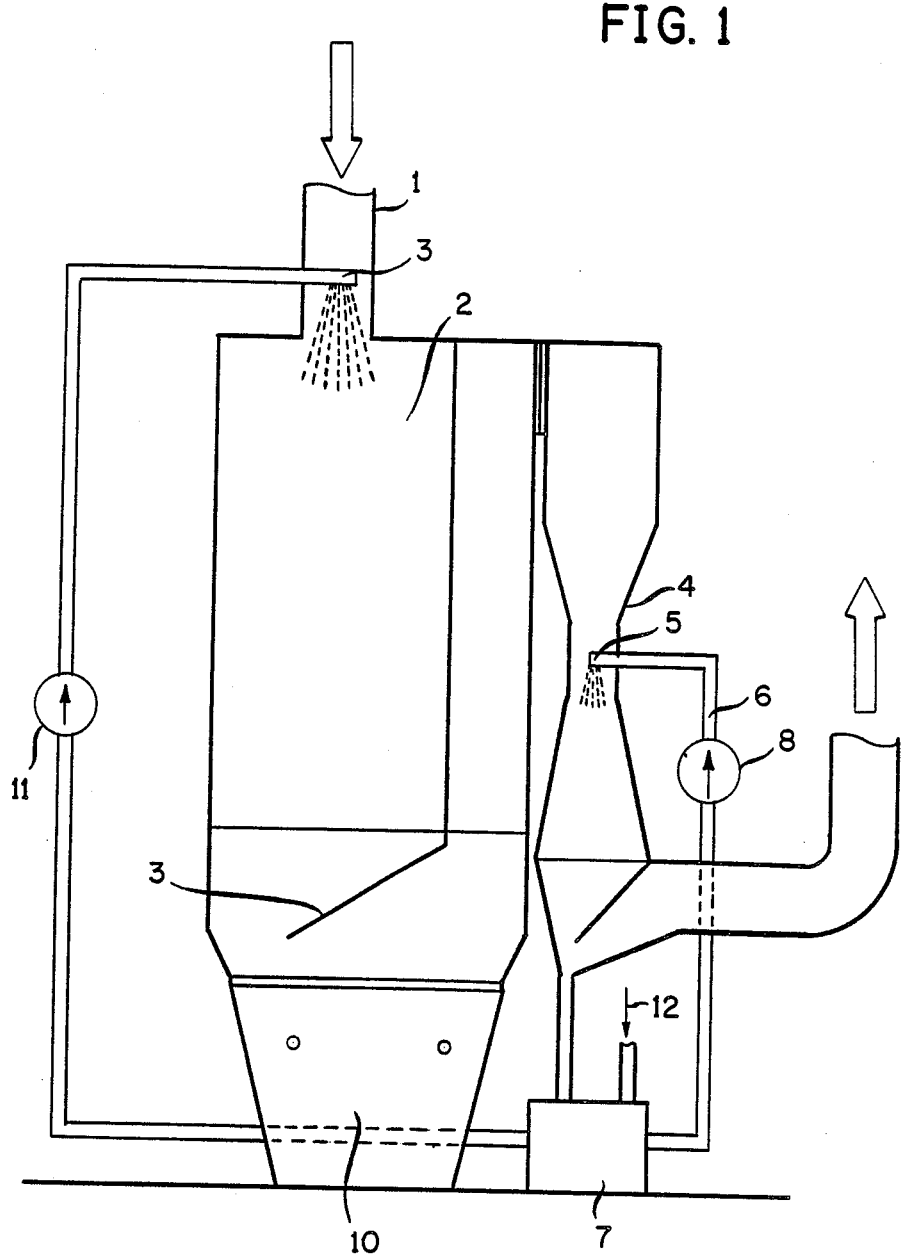

United States Patent [19]

Glindsjö

[11] Patent Number: 4,898,720
[45] Date of Patent: Feb. 6, 1990

[54] METHOD FOR GASCLEANING AND A DEVICE FOR THE ACCOMPLISHMENT OF THE METHOD

[76] Inventor: Per Glindsjö, Nygatan 136, SE-602, 31 Norrköping, Sweden

[21] Appl. No.: 182,451

[22] Filed: Apr. 18, 1988

[51] Int. Cl.$^4$ .............................................. B01D 47/00
[52] U.S. Cl. ........................................ 423/210; 55/73; 55/89; 55/94; 55/71; 423/240; 423/242; 422/170
[58] Field of Search ................... 55/73, 89, 71, 93, 94; 423/240, 242 R, 242 A, 210; 261/147, 116; 422/169, 170

[56] References Cited

U.S. PATENT DOCUMENTS

| | | |
|---|---|---|
| 2,578,315 | 12/1951 | Parker .................................... 55/82 |
| 2,852,090 | 9/1958 | Kelley .................................. 261/147 |
| 3,121,127 | 2/1964 | Hedin .................................. 261/116 |
| 3,773,472 | 11/1973 | Hausberg et al. .............. 423/242 A |
| 3,969,482 | 7/1976 | Teller ....................................... 55/73 |
| 4,198,380 | 4/1980 | Kohl .............................. 423/242 A |
| 4,533,522 | 8/1985 | Leimkuhler .................... 423/242 A |

Primary Examiner—Bernard Nozick
Attorney, Agent, or Firm—Horst M. Kasper

[57] ABSTRACT

This invention relates to a method and a device for gascleaning. The method is characterized in that materials are recirculated between a scrubber loop (4,5,6,7,8) and a loop (4,11,9,2,3,10), said material being separated after a certain recirculation via a means (3) in the form of a deflection sheet direct to a container (10) in a dry form.

13 Claims, 1 Drawing Sheet

METHOD FOR GASCLEANING AND A DEVICE FOR THE ACCOMPLISHMENT OF THE METHOD

This invention relates to a method for gascleaning and a device for the accomplishment of the method.

At gascleaning so called wet scrubbers are often used. Dust and other pollutions absorb to the scrubber water with a variety of efficiency. One problem is that the scrubber water must be cleaned which is a rather expensive method.

The purpose with this invention is to achieve a dry waste-product by using two recirculating circuits acting together with a scrubber unit and an another unit for drying the waste material from the scrubber. The purpose is also to achieve high efficiency when separating dust and gases as $SO_2$ and HCl.

The invention will now be described more closely with reference to the enclosed drawing where FIG. 1 shows the device according to the invention from the side.

In the construction of the FIG. 1 the dirty gas enters an inlet 1 whereby the gas passes a gasreactor 2, a deflection sheet 3 and enters a scrubber consisting of a venturi 4, a nozzle 5, the scrubber water 6, which recirculates by a pump 8, and a tank 7. Dust which separates, when it is absorbed to or is solved in the atomized scrubber water, is recirculated together with the scrubber water is a loop consisting of the components 4,5,7,8 and 6.

Part of the recirculating dust is led out of the loop by a pump 11 to a nozzle 9, where it is atomized to such a size that part of said dust after drying in the gasreactor 2 is separated by means of said deflection sheet 3 direct to a container 10. Dust which is not separated, passes further to the scrubber, where it is again absorbed to the scrubber water 6 and after a certain recirculation it is led to away from the loop in order to with a certain probability again be separated to said container 10.

If the gas contents $SO_2$ or HCl, alkalies are added said tank 7 at 12. In this case absorption of these gases occurs mostly in the scrubber loop 4-8, whereafter the wasteproducts are led to the nozzle 9 and are dried up to a solid phase and are separated to said container 10.

The amount of material which is in recirculation in the scrubber loop 4-8 as well as in the loop consisting of 4,11,9,2,3 and 10 will reach a state of balance and it depends on the degree of separation at the deflection sheet 3. A lower degree of separating gives a higher amount of recirculating material and a higher separating degree for $SO_2$ and HCl, when alkalies are added said tank 7 at 12.

The system with two loops acting together in a balance thus gives a higher separating degree when cleaning $SO_2$ and HCl compared with the case when the two systems act separately with a given input of alkali at 12 and a given content of $SO_2$ or HCl in the entering gas at 1. The result is the same for other gases than $SO_2$ and HCl.

I claim:

1. An apparatus for gas cleaning comprising
   a gas reactor;
   an inlet disposed at the gas reactor;
   a wall provided inside of the gas reactor;
   a deflection sheet disposed at the wall near a bottom of the gas reactor causing the gas to flow around the edge of the deflection sheet;
   a container disposed below the gas reactor, where the deflection sheet guides the particles into the container;
   a venturi tube connected to an upper side of the gas reactor with a tubular and a nozzle disposed in the venturi tube in an area of constriction for providing scrubber water;
   a tank disposed below the venturi for collecting water coming from the nozzle;
   a recirculating pump connected to the tank and to the nozzle for pumping water from the tank to the nozzle;
   an alkali inlet furnished at the tank;
   a second pump connected to the tank;
   a second nozzle disposed at the top of the gas reactor and connected to the second pump for spraying water into the gas reactor.

2. The apparatus for gas cleaning according to claim 1 wherein the gas reactor and the venturi are constructed for a concurrent flow of gas and liquid in both the gas reactor and in the venturi.

3. The apparatus for gas cleaning according to claim 1 wherein the deflection sheet is disposed in a lower part of the gas reactor for a separation of larger particles.

4. The apparatus for gas cleaning according to claim 1 further comprising
   a discharge part at the container for removal of solid particles.

5. An apparatus for gas cleaning comprising
   a gas reactor (2) having an input port (1) and having a deflection plate (3) for a separation of larger particles and for feeding these particles into a container (10);
   a scrubber arrangement connected to the gas reactor (2) including an air funnel (4), a nozzle (5), scrubber water (6) feedable with a pump (8);
   a container having an alkaline solution inlet part for feeding a part of the recycled materials from the scruffer arrangement with a pump (11) to a nozzle (4) disposed at the feed-in opening (1) of the gas reactor.

6. The apparatus for gas cleaning according to claim 5 wherein the deflection plate is disposed at the wall near a bottom of the gas reactor causing the gas to flow around the edge of the deflection plate.

7. The apparatus for gas cleaning according to claim 5 wherein the container is disposed below the gas reactor and wherein the deflection plate guides the particles into the container.

8. The apparatus for gas cleaning according to claim 5 wherein the gas reactor and the venturi are constructed for a concurrent flow of gas and liquid in both the gas reactor and in the venturi.

9. An apparatus for gas cleaning according to claim 5 wherein the deflection plate is disposed in a lower part of the gas reactor for a separation of larger particles.

10. An apparatus for gas cleaning according to claim 5 further comprising
    a discharge port at the container for removal of solid particles.

11. A method for gascleaning comprising the steps of
    feeding dirty gas into an inlet of a gas reactor;
    flowing the dirty gas around an edge of a deflection plate mounted at a bottom of a wall inside the gas reactor;
    feeding the dirty gas from the deflection sheet to a venturi pipe;

spraying water into the venturi pipe at a constriction;
collecting the water from the venturi pipe in a tank;
pumping the water in the tank with a pump to the nozzle in the venturi pipe;
pumping water from the tank with a second pump to a second nozzle disposed at the top of the gas reactor.

12. The method for gascleaning according to claim 11 further comprising
concurrently flowing both gas and liquid in the gas reactor and in the venturi.

13. The method for gascleaning according to claim 11 further comprising
dropping solid particles out of a port of the container.

* * * * *